United States Patent [19]

Hurd

[11] 3,885,139

[45] May 20, 1975

[54] WIDEBAND DIGITAL PSEUDO-GAUSSIAN NOISE GENERATOR

[75] Inventor: William J. Hurd, LaCanada, Calif.

[73] Assignee: California Institute of Technology, Pasadena, Calif.

[22] Filed: July 27, 1973

[21] Appl. No.: 383,386

[52] U.S. Cl. .................... 235/152; 331/78

[51] Int. Cl. .................... G06f 7/00

[58] Field of Search .............. 235/152, 156; 331/78; 328/27; 307/216

[56] References Cited

UNITED STATES PATENTS

| | | | |
|---|---|---|---|
| 3,439,279 | 4/1969 | Guanella | 331/78 X |
| 3,691,472 | 9/1972 | Bohman | 331/778 X |
| 3,700,869 | 10/1972 | Low et al. | 235/152 |
| 3,742,381 | 6/1973 | Hurd | 331/78 |
| 3,751,648 | 8/1973 | Wu | 235/152 |
| 3,761,696 | 9/1973 | Russell | 235/152 |

*Primary Examiner*—Malcolm A. Morrison
*Assistant Examiner*—David H. Malzahn
*Attorney, Agent, or Firm*—Lindenberg, Freilich, Wasserman, Rosen & Fernandez

[57] ABSTRACT

A wideband digital pseudo-gaussian noise generator includes a register network comprising N multistage binary shift registers, with a total number of *n* stages. The input to each register is the modulo-2 sum of the outputs of at least two stages of the network, at least one stage being from a different register. The last stages of all the registers are used in controlling the inputs to the various registers. The characteristic polynomial of the network is primitive. The registers are clocked at a selected clock frequency. The output of one stage from each register is used to provide a binary voltage. The N voltages are summed and filtered to provide a pseudo-gaussion noise which is flat to about ±0.5dB over a band equal to not less than one third the clock frequency.

24 Claims, 6 Drawing Figures

| n | N | q | T | $d_0$ | $d_{N-1}$ | $N_0$ |
|---|---|---|---|---|---|---|
| 20 | 4 | 5 | 7 | 1 | 2 | 1 |
| 20 | 4 | 5 | 7 | 1 | 3 | 1 |
| 20 | 4 | 5 | 11 | 1 | 4 | 1 |
| 60 | 10 | 6 | 29 | 2 | 3 | 3 |
| 60 | 15 | 4 | 31 | 2 | 1 | 2 |
| 80 | 16 | 5 | 25 | 4 | 3 | 7 |
| 155 | 31 | 5 | 79 | 2 | 3 | 2 |
| 160 | 32 | 5 | 29 | 2 | 1 | 3 |
| 160 | 32 | 5 | 57 | 2 | 1 | 5 |
| 288 | 32 | 9 | 81 | 6 | 7 | 13 |
| 310 | 31 | 10 | 95 | 5 | 8 | 2 |
| 310 | 31 | 10 | 119 | 5 | 6 | 3 |
| 310 | 31 | 10 | 93 | 3 | 8 | 4 |
| 310 | 31 | 10 | 117 | 6 | 9 | 4 |
| 310 | 31 | 10 | 97 | 2 | 7 | 5 |
| 310 | 31 | 10 | 97 | 5 | 2 | 5 |

| i | $d_i$ |
|---|---|
| REG 0 | 3 |
| 1 | 2 |
| 2 | 1 |
| 3 | 4 |
| 4 | 2 |
| 5 | 4 |
| 6 | 3 |
| 7 | 2 |
| 8 | 1 |
| 9 | 4 |
| 10 | 4 |
| 11 | 1 |

WIDEBAND DIGITAL PSEUDO-GAUSSIAN NOISE GENERATOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention generally relates to noise generators and, more particularly, to a wideband digital pseudo-gaussian noise generator.

2. Description of the Prior Art

Digitally generated pseudo random noise and analog generated random noise are extensively used in various research, development, simulation, testing and system evaluation and calibration activities. Digital pseudonoise has basic advantages over analog generated noise, in its repeatability and inherent stability. Therefore, analog noise signals are frequently generated by converting digital noise to analog, and digital computer applications rarely use analog generated noise.

In U.S. Pat. No. 3,742,381, a noise generator in which digital pseudonoise to analog noise conversion is disclosed. The digital pseudonoise is produced by two registers which generate maximal length pseudonoise (pn) sequences. The states of various stages of the two registers are mod-2 added by a large number, e.g., 30, of exclusive-OR gates whose outputs are in turn converted to analog signals which are summed to produce the output noise. Although, the patented generator performs quite satisfactorily, as taught in said patent, the need to sum the outputs of a large number of exclusive-OR gates is not without problems. Thus, reducing the number of outputs which have to be summed would be very advantageous.

OBJECTS AND SUMMARY OF THE INVENTION

It is a primary object of the present invention to provide a new pseudo-gaussian noise generator.

Another object is to provide a new digital pseudo-gaussian noise generator.

A further object of the present invention is to provide a new, reliable, relatively inexpensive digital pseudo-gaussian noise generator with a bandwidth of at least several Megahertz (MHz), with a spectral density which is flat to less than one decibel (dB).

Still a further object of the present invention is to provide a new, reliable digital pseudo-gaussian noise generator with a bandwidth which is greater than at least one-tenth the clock rate.

These and other objects of the invention are achieved by providing a generator in which a plurality of N registers with a total number of stages $n$ are interconnected to define a register network, whose characteristic polynomial is primitive. Therefore, the period or length of the resulting pn sequence of any stage is of maximal length and is equal to $2^n-1$. The input to each register is the output of an exclusive-OR gate which modulo-2 sums the outputs of at least two other stages of the network, at least one of the outputs being from a stage of another register. The output of the last stage of each register is used as the input to the exclusive-OR gate of the same or another register. The binary outputs of N stages, one from each register, are summed to produce the analog noise signal.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
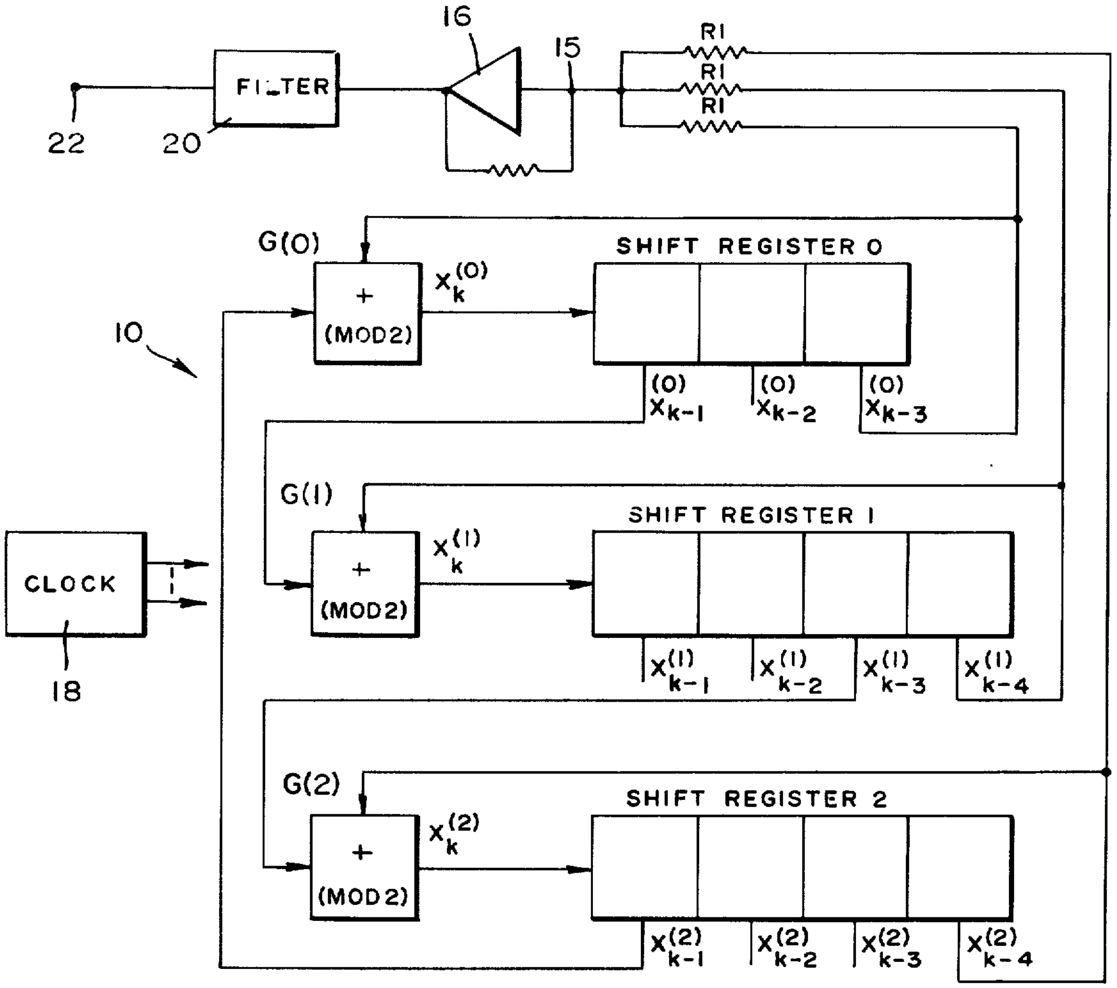
FIG. 1 is a simple diagram of one embodiment of the invention, useful in explaining the general principles of the invention.

Attention is first directed to FIG. 1 which is one simple embodiment of the noise generator of the present invention, which is presented for explanatory purposes, rather than to limit the invention thereto. In FIG. 1, the register network 10 is shown comprising of three shift registers labeled 0,1 and 2. The input to each register, assuming shifting from left to right, is the output of a different exclusive-OR gate or mod-2 summer. The three gates associated with the registers are designated G(0), G(1), and G(2). The inputs to the three registers at time $k$ are $X_k^{(0)}$, $X_k^{(1)}$ and $X_k^{(2)}$, where the superscripts designate the register numbers. At time $k$, the first (leftmost) stages of the registers store the input values at time $k-1$, i.e., $X_{k-1}^{(0)}$, $X_{K-1}^{(1)}$, and $X_{k-1}^{(2)}$. Thus, in general, stage $j$ of register $i$ stores the value $X_{k-j}^{(i)}$ at time $k$. In FIG. 1, register 0 has three stages, while each of registers 1 and 2 has four stages. The exclusive-OR gate of each register has one input from the last stage of the same register and from one stage of the preceding register. The outputs of the first, third and first stages of registers 0, 1 and 2 are respectively supplied to G(1), G(2) and G(0). Thus, the recursion can be defined by $$X_k^{(i)} = X_{k-q_i} + X_{k-d_i-1}, \; i = 0, 1, 2 \text{ (mod 3)} \qquad (1)$$

where $q_i$ is the number of stages of register $i$, and $d_{i-1}$ is the stage of register $i-1$ which is supplied to the gate G($i$). The above expression can be rewritten in terms of the delay operator as $$X_k^{(i)} = D^{q_i} X_k^{(i)} + D^{d_i-1} X^{(i-1)}, \; i=0, 1, 2 \text{ (mod 3)} \qquad (2)$$

where $D$ is the delay operator, i.e., $D^{(i)} X_k = X_{k-i}$.

This set of equations is easily solved in general for the characteristic polynomial in the delay operator as:

$$P(D) = \prod_{i=0}^{N-1} (1 + D^{q_i}) + D^{\sum_{i=0}^{N-1} d_i} \qquad (3)$$

The above expression is generalized to N registers labeled 0, 1, 2...N−1.

For the particular register network of FIG. 1

$$P(D) = (1+D^3)(1+D^4)(1+D^4) + D^{1+3+1} = (1+D^3)(1+D^8) + D^5 = 1 + D^3 + D^5 + D^8 + D^{11} \quad (4)$$

which is a primitive polynomial, as can be verified by calculations or from tables. Thus, the sequence of states of each register is a maximal length (pn) sequence of $2^{11}-1$. However, the $n$ bits ($n=11$) for the network shown in FIG. 1, at any one time are not consecutive bits from one pn-sequence, but rather are bits from several phase shifts of the sequence. It is only the bits in each one of the registers that are consecutive bits of the pn-sequence. The bits in the different registers are linearly independent, and they retain the important statistical property that all disjoint subsets, considered as binary numbers are independent and jointly uniformly distributed. This follows because all of the $2^n$-1 possible non-zero states of the n bits occur equally often.

Due to these properties in accordance with the present invention, one stage of each register, e.g., the last stage, is connected to a summing terminal 15 through a separate resistor R1. Terminal 15 is the input terminal of an operational amplifier 16. It is apparent that as the registers of the network are clocked by clock 18, the potential at terminal 15 depends on the states of the register stages connected thereto. Since their states, considered as binary numbers, are independent and jointly uniformly distributed, the current flowing through the summing network into terminal 15 during each successive clock period, is independent of its value during a previous clock period and is binomially distributed, which is therefore true of the amplifier's output voltage potential, which represents the output of the noise generator. When the number of register outputs summed is large, the binomially distributed output is a close approximation to gaussian noise. Preferably, the amplifier's output is filtered by a filter 20 designed to filter out that clocking frequency. The actual filtered output is provided at output terminal 22. In FIG. 1, the connections between the clock 18 and the registers are purposely deleted in order to simplify the figure so as to highlight only the interconnections between the registers.

To achieve simple implementations, it is desirable to restrict the register interconnections to some regular form. Forms which have each register input depend on only two stages of two other registers, as in FIG. 1, are simple. However, they may not always be satisfactory, because they may tend to suffer some of the statistical deficiencies of trinomial recursions, even though trinomial characteristic polynomials do not typically result. These deficiencies could affect both the spectrum and the gaussian quality of the pseudonoise. The next alternative is to have each register input depend on three register stages of three registers. Most configurations in which each input depends on at least three register stages would probably be satisfactory, statistically. However, for implementation considerations, the same effect may be achieved by having the first stage of each register depend on only two inputs, and to modify the connections to one stage, e.g., the last stage, of each register so that its input is the sum of its own output state and the state of the preceding stage. This operation is known as toggling, because the stage toggles, i.e., changes state, whenever its input is 1. This is the natural operation of a T flip-flop, or a J-K flip-flop with the two inputs being the same. In delay operator notation, this stage performs the operation $D/1+D$ instead of the operation $D$.

Figure 2:
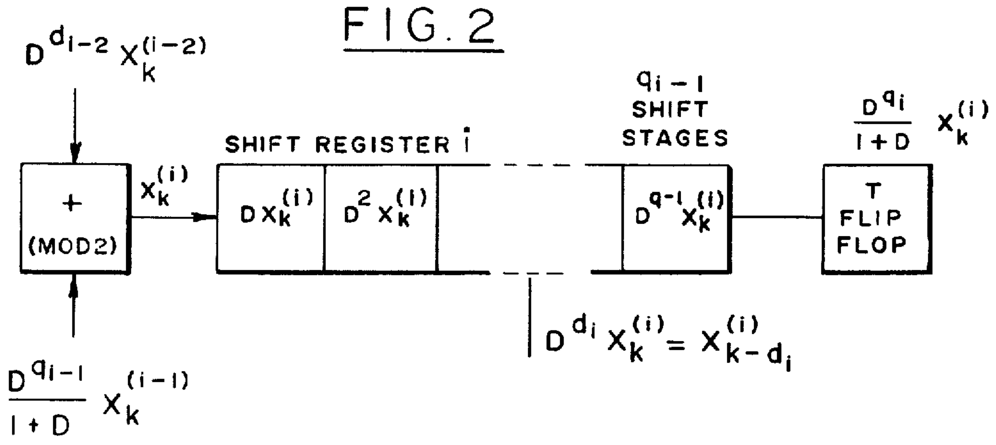
FIG. 2 is a diagram of a typical register in the register network in accordance with the present invention.

In a preferred embodiment, the register network consists in general of N registers of the form shown in FIG. 2. Register i has $q_i$ stages. The first $q_i-1$ are regular shift stages, and the last stage is a toggle stage. Thus, the stage outputs of register $i$ at time $k$ are $$DX_k^{(i)},\ D^2X_k^{(i)},\ldots,\ D^{q_i-1}X_k^{(i)} \text{ and } \frac{D^{q_i}}{1+D}X_k^{(i)} \quad (5)$$

The input $X_k^{(i)}$ to register $i$ is the modulo 2 sum of the last stage of register $i-1$ (mod N), represented by $(D^{q_{i-1}}/1+D)\,X_k^{(i-1)}$, and stage $d_{i-2}$ of register $i-2$ (mod N), represented by $D^{d_{i-2}}X_k^{i-2}$. Thus, the system is defined by the equation $$X_k^{(i)} = \frac{D^{q_{i-1}}}{1+D}X_k^{(i-1)} + D^{d_{i-2}}X_k^{(i-2)},\ i=0, 1,\ldots,N-1 \text{ (mod N)} \quad (6)$$

In order to find specific systems corresponding to primitive polynomials, it is necessary to calculate the polynomials for various values of the system parameters, and to test for primitivity. This may best be done with a computer. To test for primitivity, one computes $D^r$ (mod P(D)) for all integers $r$ which divide $2^n-1$. The polynomial P(D) is primitive if $r = 2^n-1$ is the smallest value of $r$ such that $D^r \equiv 1$ (mod P(D)). This test cannot be performed for all degrees $n$, because the factors of $2^n-1$ are not known in general. Furthermore, the average number of computations required to find a primitive polynomial increases as $n^4$. The highest degree for which a primitive polynomial system was found is 310.

Figures 3, 6:
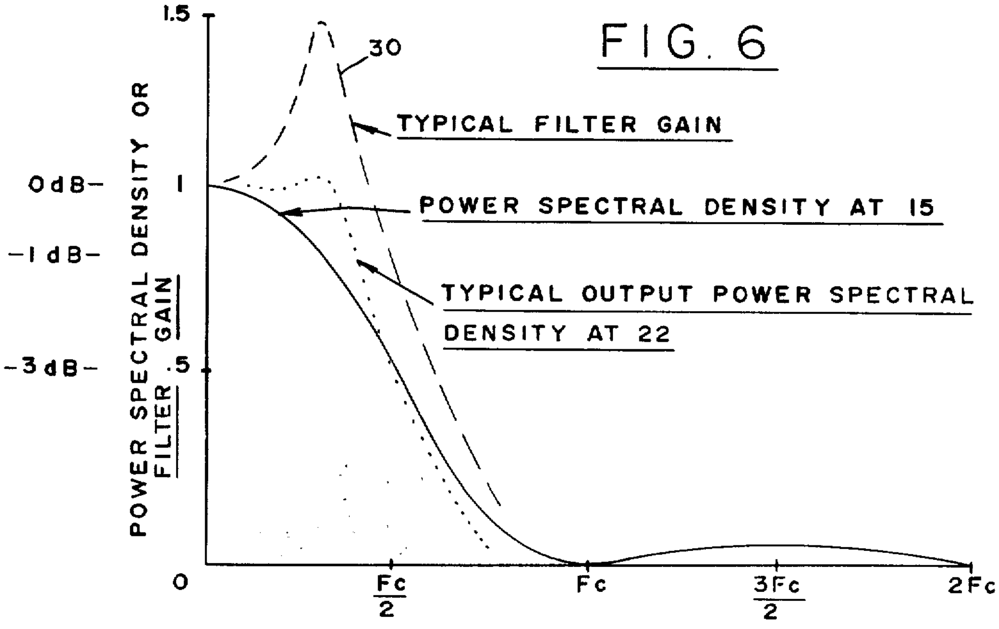
FIG. 3 is a table summarizing various embodiments of the invention.
FIG. 6 is a power spectral density diagram vs clocking frequency.

The table of FIG. 3 summarizes some of the realizations found which have primitive characteristic polynomials. This table is restricted to equal length shift registers of length $q$, with degree $n = Nq$, where $N$ is the number of registers from 0 to $N-1$. The $d_i$ are also restricted. They are allowed to assume only two values, $d_i = d_0$ for $i = 0, 1\ldots,N_0-1$, and $d_i = d_{N-1}$ for $i = N_0, N_0+1,\ldots,N-1$. In other words, the first $N_0$ of the registers have tap position $d_0$, and the last $N-N_0$ registers have tap position $d_{N-1}$. Column T in Table 1 gives the number of non-zero coefficients in the resulting polynomial, i.e., it is a T-nomial. This parameter is important because statistically better sequences tend to result when T approximates $n/2$ than when T is close to zero or close to $n$.

Thus, for example in the first realization, summarized in FIG. 3, the register network consists of four registers ($N=4$), each of five stages ($q=5$), four of which are shift stages and the last is a toggle stage. $N_0$ indiates the number of registers whose $d_0$ tap is employed as an input to another register. Since $N_0-1$, and $d_0=1$, the first tap of one register is used. From the other three registers, tap $d_{N-1} = 3$ is used. That is, the third tap of each of the last three registers is used as an input to an adjacent register.

Figure 4:
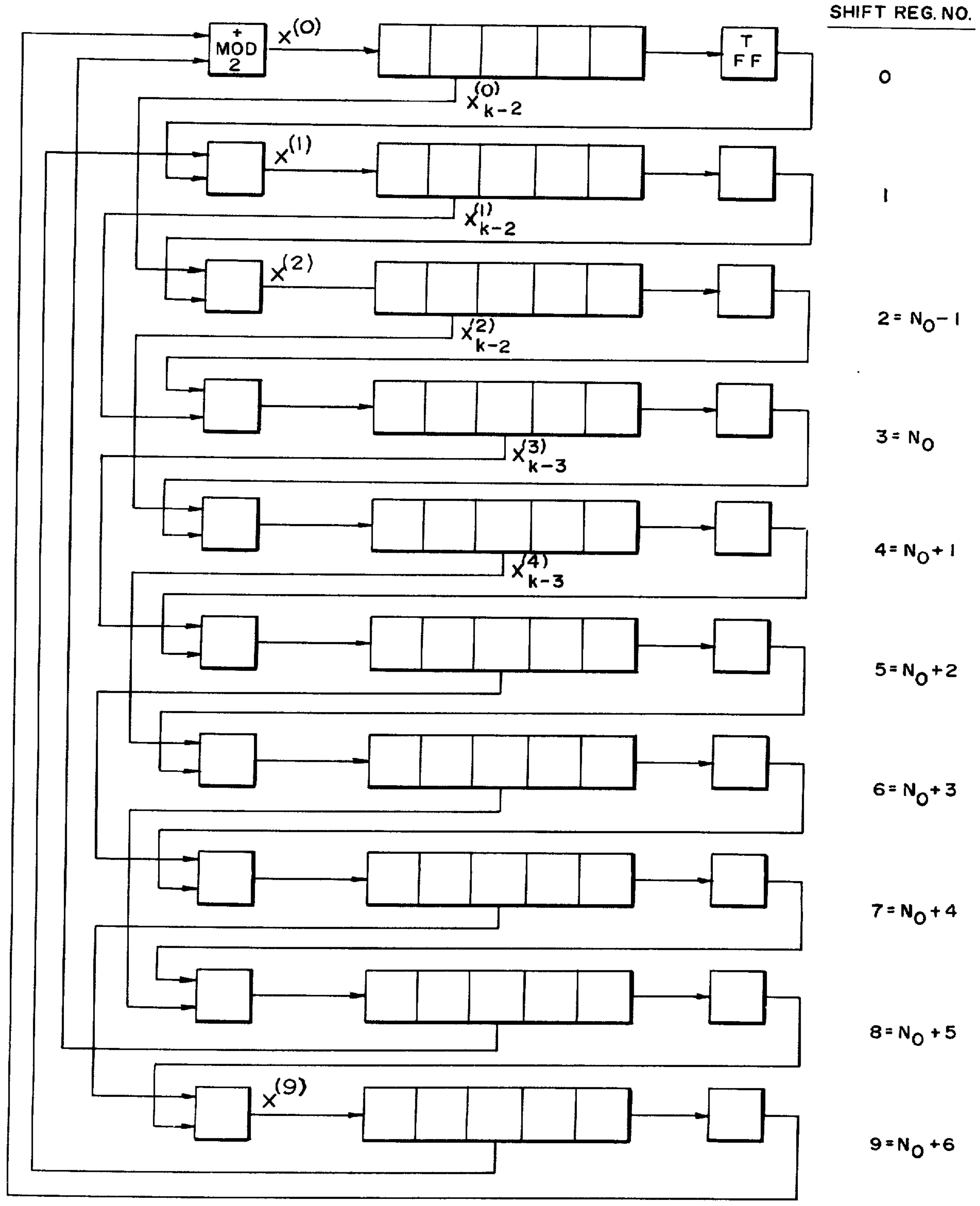
FIG. 4 is a block diagram of the fourth embodiment listed in FIG. 3.

The fourth example in FIG. 3 is diagrammed in detail in FIG. 4. In this embodiment, ten ($N=10$) registers (numbered 0 to 9) each with six ($q=6$) stages are used.

Five of the stages are shift stages and the sixth is a toggle stage. For three ($N_0$=3) of the registers, labeled 0, 1, and 2, the second tap ($d_0$=2) is used as an input to another register. From each of the remaining seven registers, it is the third ($d_{N-1}$=3) tap that is used as an input to another register.

In the realizations listed in FIG. 3, the registers are of the same length, $q$, and $d_i$ is restricted to be one of two values. Clearly, by lifting these restrictions on $q_i$ and $d_i$, other primitive configurations can be found.

Figure 5:
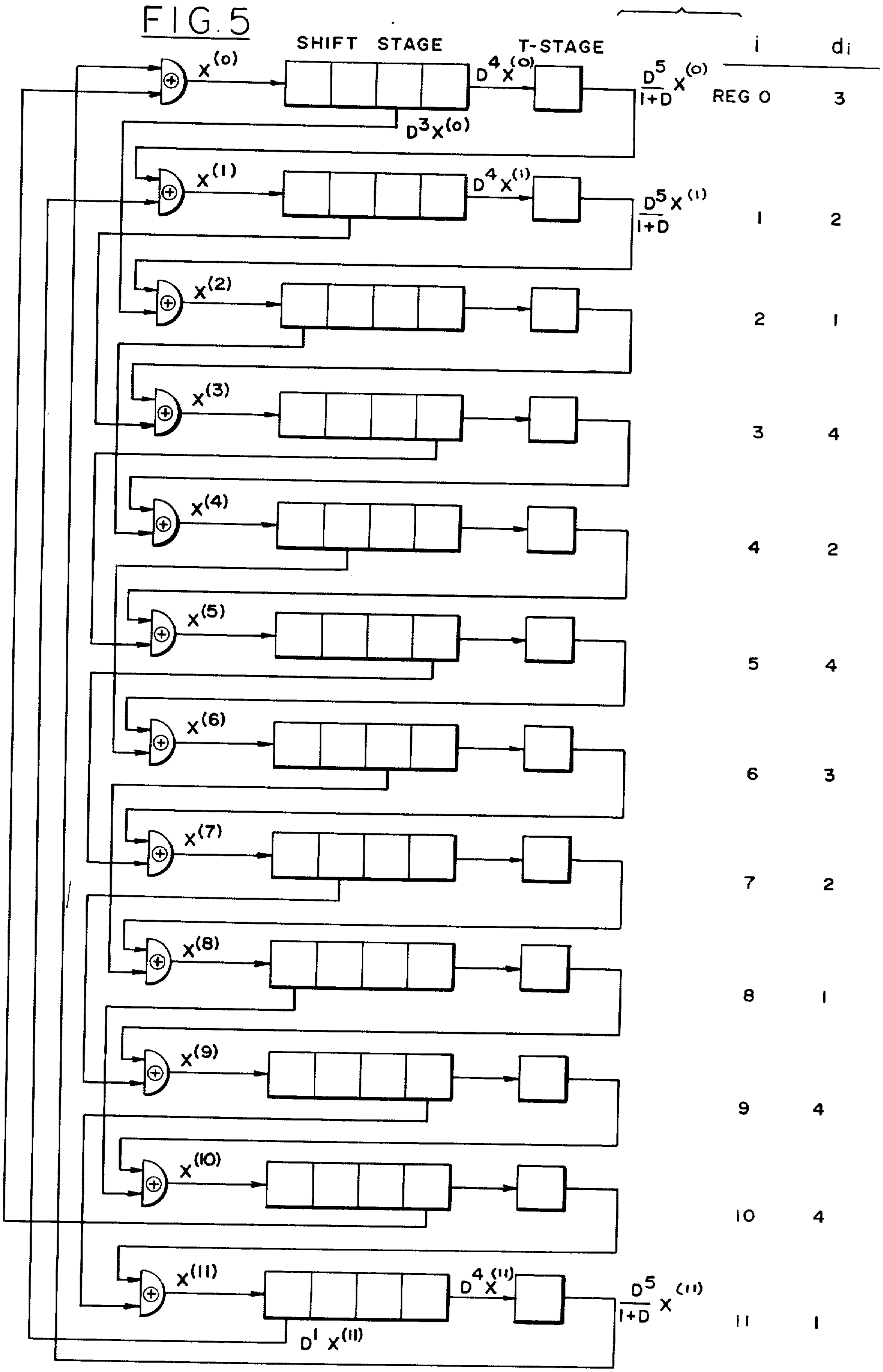
FIG. 5 is a block diagram of a register network actually reduced to practice.

An embodiment of a register network in which $n$=60, $N$=12 and $q$=5 is shown in FIG. 5. Therein, the restriction on $d_i$ is removed. The $d_i$ of registers 0 through 11 are successively 3, 2, 1, 4, 2, 4, 3, 2, 1, 4, 4 and 1. As used herein, $d_i$ is the tap output of register $i$ which is fed as an input to another register. In the particular embodiment, it is fed to register $i$+2 (Mod N). The other input to register $i$+2 is from stage $q$ (the last stage) of register $i$+1. This embodiment, which was actually reduced to practice, was found to produce a very satisfactory noise output. The length of the pn sequence is $2^{60}-1 \approx 2^{60} \approx 10^{18}$. Assuming a clock rate of 20MHz, the sequence time is $(10^{18}/20 \times 10^6) = 5 \times 10^{10}$ sec, or about 1,700 years.

In practice, the sequence length is chosen so that it does not repeat itself during the period of any experiment in which the generated noise is to be used. In the register network, the pn-sequence would advance through each of the registers if the network were clocked long enough. At any time, the sequence advancing through each of the registers is a different phase (portion of the pn-sequence). These differences, or numbers of clock periods, between the different phases cannot be determined analytically but the phases tend to be randomly distributed. For adequate noise, it is desirable that the phases be far apart so that the phase in one register at one time instant in an experiment is never the same as the phase in another register at another time instant in the same experiment. This can be assured statistically with high probability, when the period of the sequence is much longer than the duration of the experiment.

It should be pointed out that the initial states of all the stages of the register network is not important as long as at least one stage is at a 1 state. This generally occurs whenever power is turned on. However, if desired, the network may include means to set any selected stage to a 1 state in order to insure proper operation. This may be achieved by direct setting one or more of the flip-flops to their set states. Simple techniques may also be employed to reset each stage to a selected value, thus, reinitializing the system so that the same pseudonoise can be repeated.

It should further be pointed out that in each of the register networks herebefore described, the output of one stage from each register is connected through a resistor R1 to terminal 15. In the embodiment of FIG. 5, 12 stage outputs are summed. This compares with the 30 stages which were summed in the generator described in the aforementioned patent. In general, summing more register outputs results in pseudonoise which is theoretically more gaussian. The 12 register system was chosen as a compromise between implementation complexity and noise characteristics. The resulting noise is indistinguishable from gaussian in most experiments.

The theoretical power spectral density of the noise at terminal 15 is proportional to $$\left[\frac{\sin(\pi f/f_c)}{\pi f/f_c}\right]^2$$

where $f$ is the frequency and $f_c$ is the clock frequency. The spectrum which is known and stable is diagrammed in FIG. 6 for a clock frequency of 20 MHz. At $\frac{1}{2}f_c$, i.e., at 10 MHz, the power spectral density is down by about 3 dB. By choosing the amplifier 16 and filter 20 so that their combination exhibits a rising frequency response at the upper bandwidth limit as represented by dashed line 30 in FIG. 6, the observed spectral density may easily be made to be flat to within ±0.5 dB over a frequency band from 0 to about $\frac{1}{3} f_c$, i.e., to about 7 MHz. A typical resulting spectrum is shown by the dotted curve in FIG. 6. Noise flat to within ±0.1 or ±0.2 dB within this bandwidth can be achieved with more elaborate filtering.

The characteristics of the register network needed for the noise generator in accordance with the present invention may be summarized as follows. The network consists of a set of N binary shift registers of the same or different lengths, i.e., number of stages, with the total number of stages being $n$. Each stage may be either a shift or a toggle stage. The input to each register is the exclusive-OR (modulo-2 sum) of the outputs of at least 2 stages of the network, at least one of which is from another register. The output from the last stage of each register is used as an input to at least one of the registers. The stages (other than the last stages) whose outputs are selected as inputs to the various registers are chosen so that the sequence of states of each stage is a maximal length sequence, of period $2^n-1$. That is, the network's characteristic polynomial is primitive. To produce the desired noise, the binary output of one stage from each register is used to produce a binary output signal. These signals are summed in a resistor network (resistors R1 and terminal 15) amplified and filtered to smooth the output waveform shape of the spectrum, and eliminate energy at harmonics of the clock frequency. The approximation of the noise to gaussian noise improves with the number of waveforms (signals) summed. It has, however, been discovered that by summing twelve waveforms such as from the twelve registers shown in FIG. 5, very satisfactory pseudo-gaussian noise is produced.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a digital noise generator, an arrangement comprising:

a multiregister network including N binary shift registers, N being not less than 2, each shift register including not less than one stage, the total number of stages of said N shift registers being equal to $n$, where N and $n$ are integers;

input means for providing an input to each register which is the exclusive-OR function of the outputs of at least two stages of said registers, at least one of which is from a different register, with said input means being connected to said registers, so that the last stage of each of said registers is responded to by the input means providing an input to at least one register, and the characteristic polynomial of said multiregister network is primitive whereby the sequence of states of each stage of any of said registers is a maximal length sequence period of $2^n-1$, regardless of the register's number of stages;

clock means for clocking said shift registers at a preselected frequency; and output means coupled to N of said stages, one stage from each of said N registers for providing a pseudo-gaussian noise output as a function of the outputs of said N stages.

2. The arrangement as described in claim 1 wherein said input means provide an input to the ith register where $i$=0, 1,...,N−1 which is the exclusive-OR function of the output of the last stage of the $i$−1 register and the output of other than the last stage of the $i$−2 register.

3. The arrangement as described in claim 1 wherein at least one of said n stages is a toggle stage.

4. The arrangement as described in claim 3 wherein each of said registers includes at least one toggle stage.

5. The arrangement as described in claim 4 wherein the last stage of each register is a toggle stage.

6. The arrangement as described in claim 1 wherein each of said registers includes $q$ stages, $q = n/N$ with each register including at least one toggle stage, and wherein said input means provide an input to the $i$th register where $i$=0, 1,...,N−1 which is the exclusive-OR function of the output of the last stage of the $i$−1 register and the output of other than the last stage of the $i$−2 register.

7. The arrangement as described in claim 6 wherein the last stage of each register is a toggle stage.

8. The arrangement as described in claim 1 wherein $n$=20, $N$=4, each register including 5 stages with said input means being responsive to the output of the last stage of each register and the output of the first stage of one of said 4 registers and the output of the second stage of each of the other 3 registers.

9. The arrangement as described in claim 1 wherein $n$=20, $N$=4, each register including 5 stages with said input means being responsive to the output of the last stage of each register and the output of the first stage of one of said 4 registers and the output of the third stage of each of the other 3 registers.

10. The arrangement as described in claim 1 wherein $n$=20, $N$=4, each register including 5 stages with said input means being responsive to the output of the last stage of each register and the output of the first stage of one of said 4 registers and the output of the fourth stage of each of the other 3 registers.

11. The arrangement as described in claim 1 wherein $n$=60, $N$=10, each register including 6 stages, with said input means being responsive to the output of the last stage of each register and the outputs of the second stages of three of said registers and the outputs of the third stages of the rest of said registers.

12. The arrangement as described in claim 1 wherein $n$=60, $N$=15, each register including 4 stages, with said input means being responsive to the output of the last stage of each register and the outputs of the second stages of two of said registers and the outputs of the first stages of the rest of said registers.

13. The arrangement as described in claim 1 wherein $n$=80, $N$=16, each register including 5 stages, with said input means being responsive to the output of the last stage of each register and the outputs of the fourth stages of seven of said registers and the outputs of the third stages of the rest of said registers.

14. The arrangement as described in claim 1 wherein $n$=155, $N$=31, each register including 5 stages, with said input means being responsive to the output of the last stage of each register and the outputs of the second stages of two of said registers and the outputs of the third stages of the rest of said registers.

15. The arrangement as described in claim 1 wherein $n$=160, $N$=32, each register including 5 stages, with said input means being responsive to the output of the last stage of each register and the outputs of the second stages of three of said registers and the outputs of the first stages of the rest of said registers.

16. The arrangement as described in claim 1 wherein $n$=160, $N$=32, each register including 5 stages, with said input means being responsive to the output of the last stage of each register and the outputs of the second stages of five of said registers and the outputs of the first stages of the rest of said registers.

17. The arrangement as described in claim 1 wherein $n$=288, $N$=32, each register including 9 stages, with said input means being responsive to the output of the last stage of each register and the outputs of the sixth stages of thirteen of said registers and the outputs of the seventh stages of the rest of said registers.

18. The arrangement as described in claim 1 wherein $n$=310, $N$=31, each register including 10 stages, with said input means being responsive to the output of the last stage of each register and the outputs of the fifth stages of two of said registers and the outputs of the eighth stages of the rest of said registers.

19. The arrangement as described in claim 1 wherein $n$=310, $N$=31, each register including 10 stages, with said input means being responsive to the output of the last stage of each register and the outputs of the fifth stages of three of said registers and the outputs of the sixth stages of the rest of said registers.

20. The arrangement as described in claim 1 wherein $n$=310, $N$=31, each register including 10 stages, with said input means being responsive to the output of the last stage of each register and the outputs of the third stages of four of said registers and the outputs of the eighth stages of the rest of said registers.

21. The arrangement as described in claim 1 wherein $n$=310, $N$=31, each register including 10 stages, with said input means being responsive to the output of the last stage of each register and the outputs of the sixth stages of four of said registers and the outputs of the ninth stages of the rest of said registers.

22. The arrangement as described in claim 1 wherein $n$=310, $N$=31, each register including 10 stages, with said input means being responsive to the output of the last stage of each register and the outputs of the second stages of five of said registers and the outputs of the seventh stages of the rest of said registers.

23. The arrangement as described in claim 1 wherein $n$=310, $N$=31, each register including 10 stages, with said input means being responsive to the output of the last stage of each register and the outputs of the fifth stages of five of said registers and the outputs of the second stages of the rest of said registers.

24. The arrangement as described in claim 1 wherein $n$=60, $N$=12, each register including 5 stages, the last stage being a toggle stage with said input means providing an input to each register, designated as the $i$th register where $i$=0, 1,...,11, which is the exclusive-OR function of the output of the last stage of the $i-1$ register and the $d$th stage of the $i-2$ register, the $d$th stages of said 0 to 11 registers being the third, second, first, fourth, second, fourth, third, second, first, fourth, fourth and first stages of said registers.

* * * * *